United States Patent [19]
Kobayashi et al.

[11] Patent Number: 6,047,795
[45] Date of Patent: Apr. 11, 2000

[54] MOUNTING MEMBER FOR DISK BRAKE AND METHOD OF PRODUCING THE SAME

[75] Inventors: Kinzo Kobayashi; Yukio Tanaka; Shinji Suzuki; Kouichi Masuko, all of Yamanashi-Ken, Japan

[73] Assignee: Tokico Ltd., Kawasaki, Japan

[21] Appl. No.: 08/858,463

[22] Filed: May 19, 1997

[30] Foreign Application Priority Data

May 20, 1996 [JP] Japan .................................. 8-148688

[51] Int. Cl.⁷ .................................................. F16D 65/14
[52] U.S. Cl. .................................... 188/73.45; 188/73.44; 188/73.46; 188/73.43
[58] Field of Search ........................... 188/73.45, 73.46, 188/73.42, 73.43, 73.44

[56] References Cited

U.S. PATENT DOCUMENTS 5,526,904  6/1996  Walden et al. ...................... 188/73.45
5,657,837  8/1997  Yamadera et al. ................... 188/73.45
5,810,122  9/1998  Le Deit et al. ....................... 188/73.45

*Primary Examiner*—Christopher P. Schwartz
*Assistant Examiner*—Devon Kramer
*Attorney, Agent, or Firm*—Wenderoth, Lind & Ponack, L.L.P.

[57] ABSTRACT

A disk brake mounting member having a pair of left and right arms spaced apart from each other in the circumferential direction of a disk. A pair of left and right pin holes are formed in the left and right arms, respectively, with different bore diameters. The pin holes are fitted with sliding pins, respectively, which support a caliper slidably in the axial direction of the disk. The arms are previously provided with left and right projections near the respective open ends of the pin holes so as to be in symmetry with each other. At least one of the projections is formed into a shape different from that of the other when the pin holes are formed in the arms by machining. Also disclosed is a method of producing the disk brake mounting member. According to this method, a mounting member is first cast to have left and right projections. One of the projections is then cut off.

8 Claims, 12 Drawing Sheets

DISK PASS PORTION CUTTING PROCESS

DISK PASS PORTION CUTTING PROCESS

Fig. 9  PAD GUIDE CUTTING PROCESS

FIRST PIN HOLE DRILLING PROCESS

SECOND PIN HOLE DRILLING PROCESS

MOUNTING GROOVE CUTTING PROCESS

FOURTH PIN HOLE DRILLING PROCESS

MOUNTING MEMBER FOR DISK BRAKE AND METHOD OF PRODUCING THE SAME

BACKGROUND OF THE INVENTION

The present invention relates to a mounting member for a disk brake suitably used to apply braking force to a vehicle, for example, and also relates to a method of producing the disk brake mounting member. More particularly, the present invention relates to an improvement in a disk brake mounting member whereby disk brake mounting members to be installed on the right and left sides, respectively, of a vehicle are surely prevented from being erroneously installed on the wrong side.

A generally known disk brake includes a mounting member having a pair of arms spaced apart from each other in the circumferential direction of a disk. The pair of arms extend over the outer periphery of the disk in the axial direction of the disk. A caliper is slidably supported by the arms of the mounting member so as to extend over from one side to the other side of the disk between the arms. The disk brake further includes a pair of inner and outer friction pads adapted to be pressed against both sides of the disk by the action of a piston slidably fitted in a cylinder provided in the caliper.

In this type of conventional disk brake, when a braking operation is initiated, the piston provided in the cylinder of the caliper is caused to slide toward the disk by the externally supplied hydraulic pressure. The whole caliper slides toward the inner side of the disk relative to the mounting member, thereby pressing the friction pads against both sides of the disk between the piston and the outer side of the caliper. Thus, applying braking force is applied to the disk.

The mounting member has a portion fixed to a non-rotating portion of a vehicle at one side of the disk. A pair of left and right arms are located outside the fixed portion as viewed in the radial direction of the disk. The left and right arms are spaced apart from each other in the circumferential direction of the disk. A pair of left and right pin holes are formed in the left and right arms, respectively, with different bore diameters. The left and right pin holes are fitted with sliding pins, respectively, which support the caliper slidably in the axial direction of the disk.

There is a known mounting member wherein the left and right pin holes are formed with different bore diameters to make the clearance for the sliding pin in one pin hole larger than that in the other pin hole. Therefore, the caliper can smoothly slide in the axial direction of the disk even when the torque from the disk acts on the arms of the mounting member during a braking operation or the like such that the arms, together with the pin holes, are elastically deformed in the rotational direction of the disk.

Incidentally, the above-described conventional technique suffers from the problem that when pin holes with different bore diameters are to be formed in the left and right arms of the mounting member, the way of machining to form pin holes must be reversed according to whether the mounting member to be machined is for a right wheel or for a left wheel. Accordingly, it takes time and labor to drill pin holes, and erroneous machining is likely to occur.

Upon installing a caliper on a mounting member or upon mounting a mounting member on a non-rotating portion of a vehicle, erroneous mounting is likely to occur because the mounting orientation of a mounting member for a right wheel and that for a left wheel are opposite to each other. Accordingly, the working efficiency in such a mounting operation degrades.

To solve such problems, according to another conventional technique, mounting members to be used for right and left wheels, respectively, are molded by using different molds. Therefore, when pin holes are to be drilled in a mounting member or when a caliper is to be installed on a mounting member, the operator can readily see whether the mounting member concerned is one for a right wheel or one for a left wheel by visual check. Thereby, the above-described erroneous drilling of pin holes or erroneous installation of a caliper is prevented.

In such a case, however, it is necessary to prepare a mold for a mounting member for a right wheel and another mold for a mounting member for a left wheel because the mounting members to be used for right and left wheels, respectively, have different shapes. Therefore, it takes time and labor to produce and manage molds for forming mounting members of different shapes, and management and other costs undesirably increase.

BRIEF SUMMARY OF THE INVENTION

In view of the above-described problems associated with the conventional techniques, an object of the present invention is to provide a disk brake mounting member designed so that it is possible to prevent the occurrence of erroneous machining when left and right pin holes having different bore diameters are drilled in the left and right arms, respectively. Hence, it is possible to improve the working efficiencies in production and machining, and it is also possible to prevent the occurrence of erroneous installation and surely improve the working efficiency in installation.

Another object of the present invention is to provide a method of producing the above disk brake mounting member.

To solve the above-described problems, the present invention is applied to a disk brake mounting member having a fixed portion fixed to a non-rotating portion of a vehicle at one side of a disk. A pair of left and right arms are located outside the fixed portion as viewed in the radial direction of the disk. The left and right arms are spaced apart from each other in the circumferential direction of the disk. A pair of left and right pin holes are formed in the left and right arms, respectively, with different bore diameters. The left and right pin holes are fitted with sliding pins, respectively, which support a caliper slidably in the axial direction of the disk.

One feature of an arrangement adopted by the present invention resides in that the left and right arms are provided with left and right indications, such as projections, near the respective open ends of the pin holes so as to be in symmetry with each other. At least one of the projections is altered (for example, by machining) when the pin holes are machined in the left and right arms. Therefore, since one projection has an alteration the projections have shapes different from each other.

By virtue of the above-described arrangement, before a pin hole for a sliding pin is drilled in each arm, the overall configuration of the mounting member, including the left and right projections, can be made symmetrical. Accordingly, mounting members to be used, for example, for left and right wheels, respectively, can be formed using the same mold.

Further, since at least one of the projections is formed with a different shape, a pin hole to be formed with a relatively large diameter and a pin hole to be formed with a relatively small diameter can be readily distinguished from each other by an operator's visual check or with a sensor or the like. Accordingly, the pin holes can be drilled in the corresponding arms without a mistake.

Moreover, since the projections are provided near the respective open ends of the pin holes, at least one of the projections can be readily cut at the same time as the pin holes are machined by using cutting tools or other similar devices.

According to one embodiment of the present invention, the left and right arms have mounting grooves, respectively, for mounting dust boots that protect the sliding surfaces of the pin holes and sliding pins. The mounting grooves are provided on the respective open ends of the pin holes. The projections each project radially outward of the mounting groove associated therewith at a position near the mounting groove.

Consequently, by cutting the mounting grooves with cutting tools or the like, at least one of the projections provided near the mounting grooves can be readily cut at the same time as the mounting grooves are cut.

In addition, the present invention provides a method of producing a disk brake mounting member having a fixed portion fixed to a non-rotating portion of a vehicle at one side of a disk. A pair of left and right arms are located outside the fixed portion as viewed in the radial direction of the disk. The left and right arms are spaced apart from each other in the circumferential direction of the disk. A pair of left and right pin holes are formed in the left and right arms, respectively, with different bore diameters. The left and right pin holes are fitted with sliding pins, respectively, which support a caliper slidably in the axial direction of the disk. The method includes the step of integrally molding the fixed portion and the left and right arms, wherein the left and right arms respectively have left and right projections integrally formed thereon so as to be in symmetry with each other, and the step of machining at least one of the projections into a shape different from that of the other.

According to the above-described production method, when the fixed portion and the arms are molded, for example, by casting to produce the mounting member, the left and right arms are previously provided with left and right indicators, such as projections, respectively. Therefore, the overall configuration of the mounting member, including the projections, can be made symmetrical. In the subsequent step, at least one of the projections is altered into a shape different from that of the other. Therefore, each pin hole can be drilled without a mistake by distinguishing the left and right arms from each other by the presence of a projection or the difference in shape between the projections. Accordingly, mounting members to be used, for example, for left and right wheels, respectively, can be formed using the same mold.

DETAILED DESCRIPTION OF THE INVENTION

Figure 1:
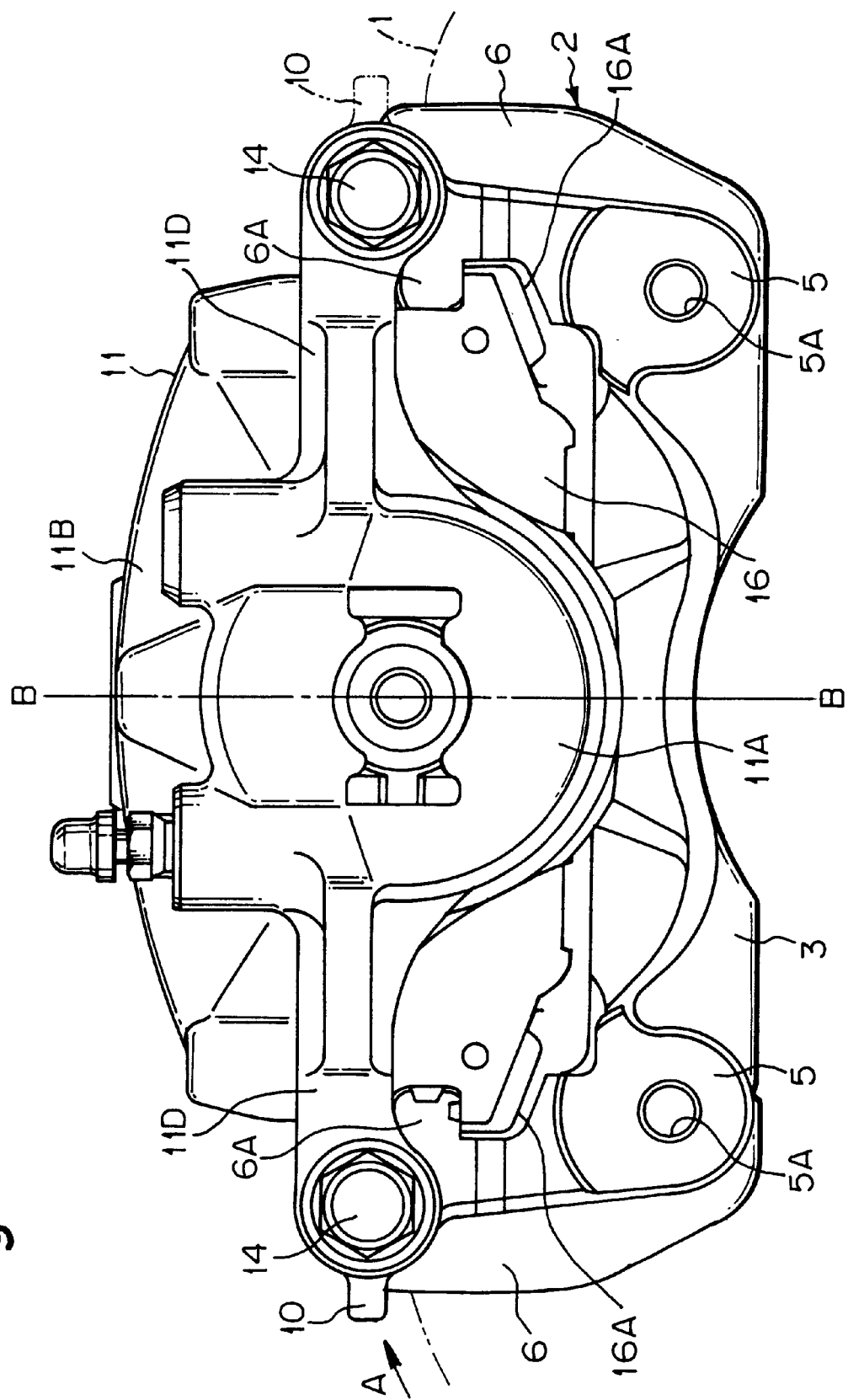
FIG. 1 is a front view of a disk brake according to an embodiment of the present invention.

Embodiments of the present invention will be described below in detail with reference to the accompanying drawings.

FIGS. 1 to 14 show a disk brake according to an embodiment of the present invention as applied to an automobile.

In the figures, a disk 1 rotates in the direction of the arrow A together with a wheel of an automobile. A mounting bracket 2 serves as a disk brake mounting member that constitutes a part of a disk brake. The mounting bracket 2 is integrally mounted on a non-rotating portion (not shown) of the automobile at a position on one side (inner side) of the disk 1. The mounting bracket 2 has an elongated plate-shaped bracket body 3 extending in a circumferential direction of the disk 1 at the inner side of the disk 1. The mounting bracket 2 further has an elongated reinforcing beam 4 extending in a circumferential direction of the disk 1 at the outer side of the disk 1, and arms 6 (described later). The bracket body 3, the reinforcing beam 4 and the arms 6 are integrally molded by casting or other similar method.

The bracket body 3 has left and right fixing portions 5 provided at both longitudinal ends, respectively, of the bracket body 3. The fixing portions 5 each have an approximately circular outer shape. Each fixing portion 5 has a screw hole 5A in a central portion thereof. The inner side of each fixing portion 5 is firmly fixed to the non-rotating portion through a bolt (not shown) or the like.

The mounting bracket 2 is formed by subjecting a cast mounting bracket 2' (shown in FIG. 7) to cutting and other machining processes. The mounting bracket 2' is formed such that the overall configuration, including each projection 10, is symmetric about the center line B—B for reasons stated later.

The left and right arms 6 are spaced apart from each other in the circumferential direction of the disk 1. As shown in FIGS. 1 to 5, the inner side (i.e. proximal end) of each arm 6 is integrally connected to one longitudinal end of the bracket body 3, and the outer side (i.e. distal end) of each arm 6 extends in an axial direction of the disk 1 over the outer periphery of the disk 1 and is integrally connected to one end of the reinforcing beam 4.

Each arm 6 has an approximately U-shaped pad guide portion 6A formed on each of the proximal and distal ends thereof (only the inner side pad guide portions 6A are shown in the figures). Moreover, each arm 6 has a disk pass portion 6B (see FIG. 8) formed to have a U-shaped space at a longitudinal intermediate portion thereof to allow the disk 1 to rotate in the direction of the arrow A. Further, each arm 6 has a stepped cylinder-shaped mounting cylindrical portion 6C (FIG. 4) projecting from the proximal end surface thereof by a predetermined length in the axial direction of the arm 6. The proximal end surface of each arm 6 defines an open end of a pin hole 8 or 9 (described later).

Each arm 6 has a substantially flat side portion 6D at an outer side thereof opposite to the pad guide portion 6A. A projection 10 is provided on the upper end (in a radial direction outside of the disk 1) of each side portion 6D at a position near the mounting cylindrical portion 6C. Of the arms 6, only the left-hand arm 6 is provided with the projection 10. The projection 10 of the right-hand arm 6 is cut off when the pin hole 9 is formed by machining.

Left and right mounting grooves 7 are provided on the respective mounting cylindrical portions 6C of the arms 6. Each mounting groove 7 is formed by cutting a U-groove over the entire circumference of the outer peripheral surface of the mounting cylindrical portion 6C. Each mounting groove 7 prevents dislodging of a dust boot 15 (described later) mounted on the mounting cylindrical portion 6C.

Figure 3:
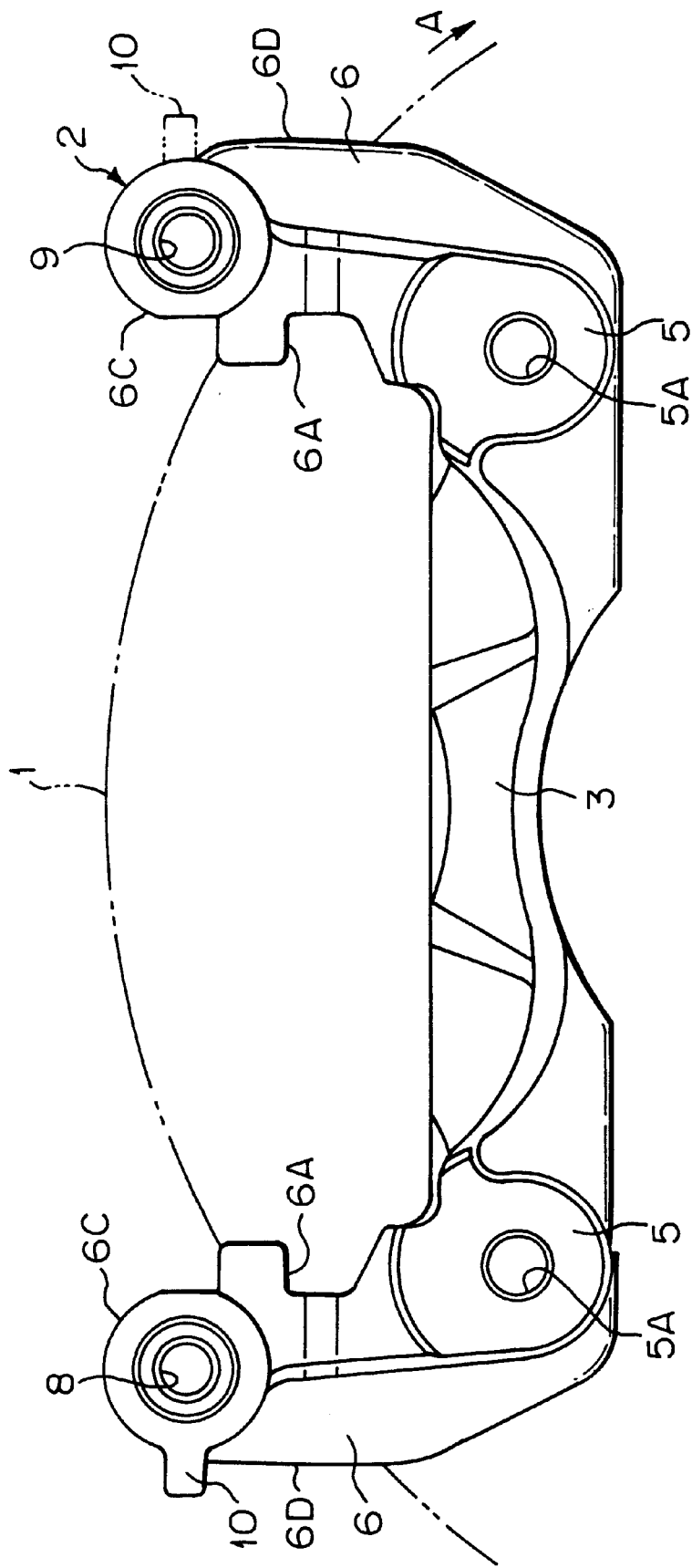
FIG. 3 is a front view showing a mounting member in FIG. 1.
Figure 4:
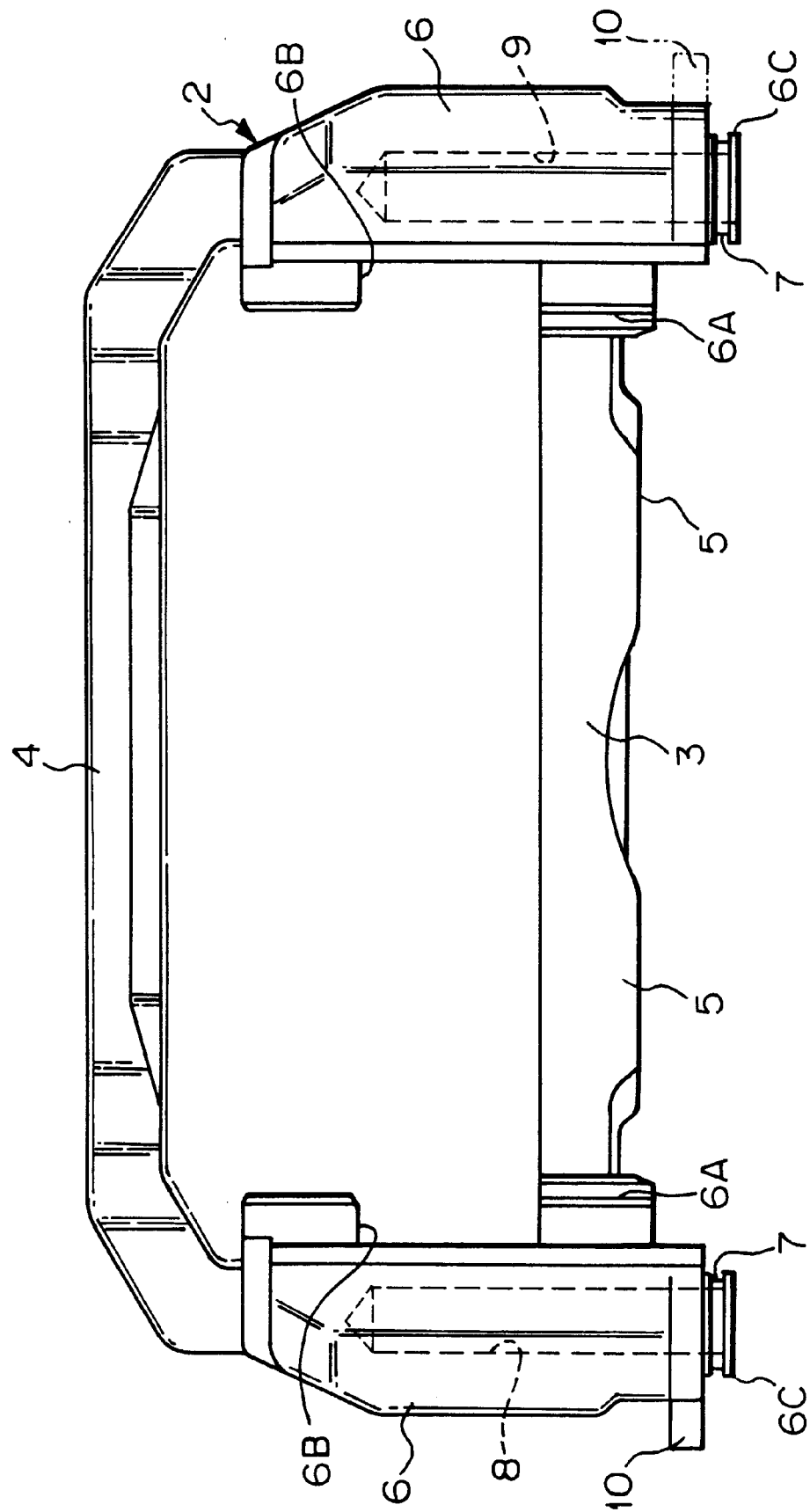
FIG. 4 is a bottom view of the mounting member shown in FIG. 3.
Figure 5:
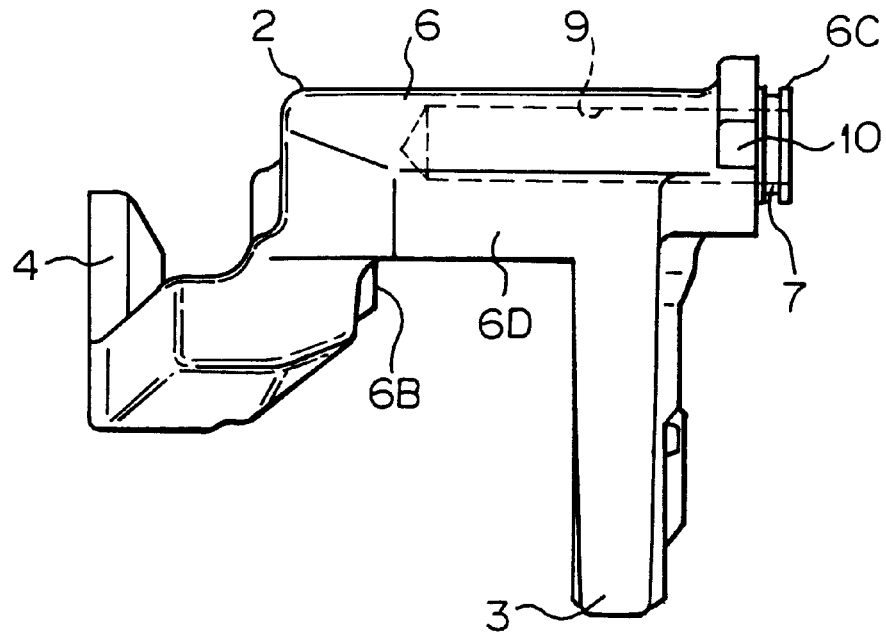
FIG. 5 is a side view of the mounting member as viewed from the left-hand side in FIG. 4.
Figure 6:
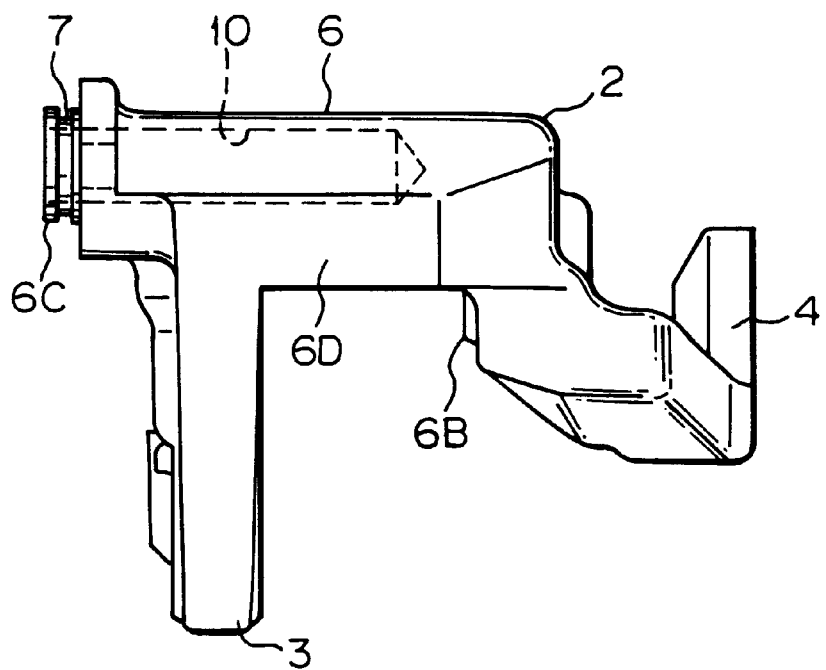
FIG. 6 is a side view of the mounting member as viewed from the right-hand side in FIG. 4.

The left and right pin holes 8 and 9 are formed in the respective arms 6. The pin holes 8 and 9 have different bore diameters. As shown in FIGS. 3 to 5, the pin holes 8 and 9 are each formed as a circular hole with a bottom that axially extends in each arm 6, and are open to the outside through the mounting cylindrical portions 6C. The inner diameter (bore diameter) of the pin hole 8 is set slightly larger than that of the pin hole 9. The pin holes 8 and 9 are formed by successively subjecting the arms 6 to several different kinds of machining, including cutting, using cutting tools 21 and 22, deep hole drilling tools 24 and 25, and reamers 27 and 28, as described later.

Figure 7:
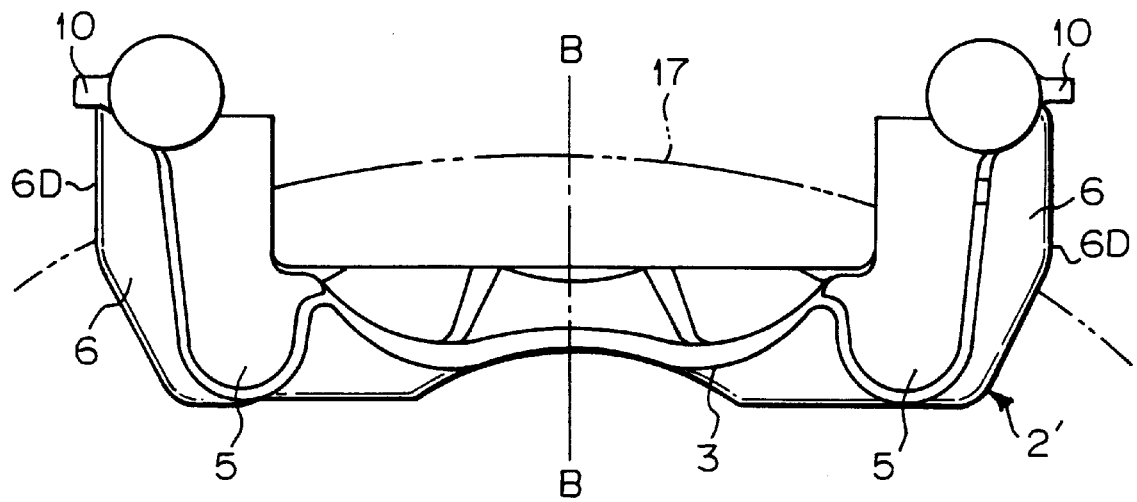
FIG. 7 is a front view of the mounting member, showing a process for cutting a disk pass portion.

The left and right projections 10 are provided on the respective arms 6 of the mounting bracket 2. As shown in FIGS. 1 and 7, the proximal ends of the projections 10 are integrally formed on the respective arms 6 on the side of the open ends of the pin holes 8 and 9 near the mounting grooves 7. The distal ends of the projections 10 project leftward and rightward, respectively, so as to extend to the outside of the mounting grooves 7 as viewed in the radial direction of the disk 1. The projections 10 are disposed outside the corresponding side portions 6D of the arms 6 as viewed in the radial direction of the disk 1.

As shown in FIG. 7, the projections 10 are previously formed on the arms 6 of the mounting bracket 2' at respective positions which are symmetrical with respect to the center line B—B of the mounting bracket 2'. Of the projections 10, the right-hand projection 10 is altered (for example, cut off) when the pin holes 8 and 9 are formed by machining. With only the left-hand projection 10 left, the mounting bracket 2 is finished as a product.

Figure 2:
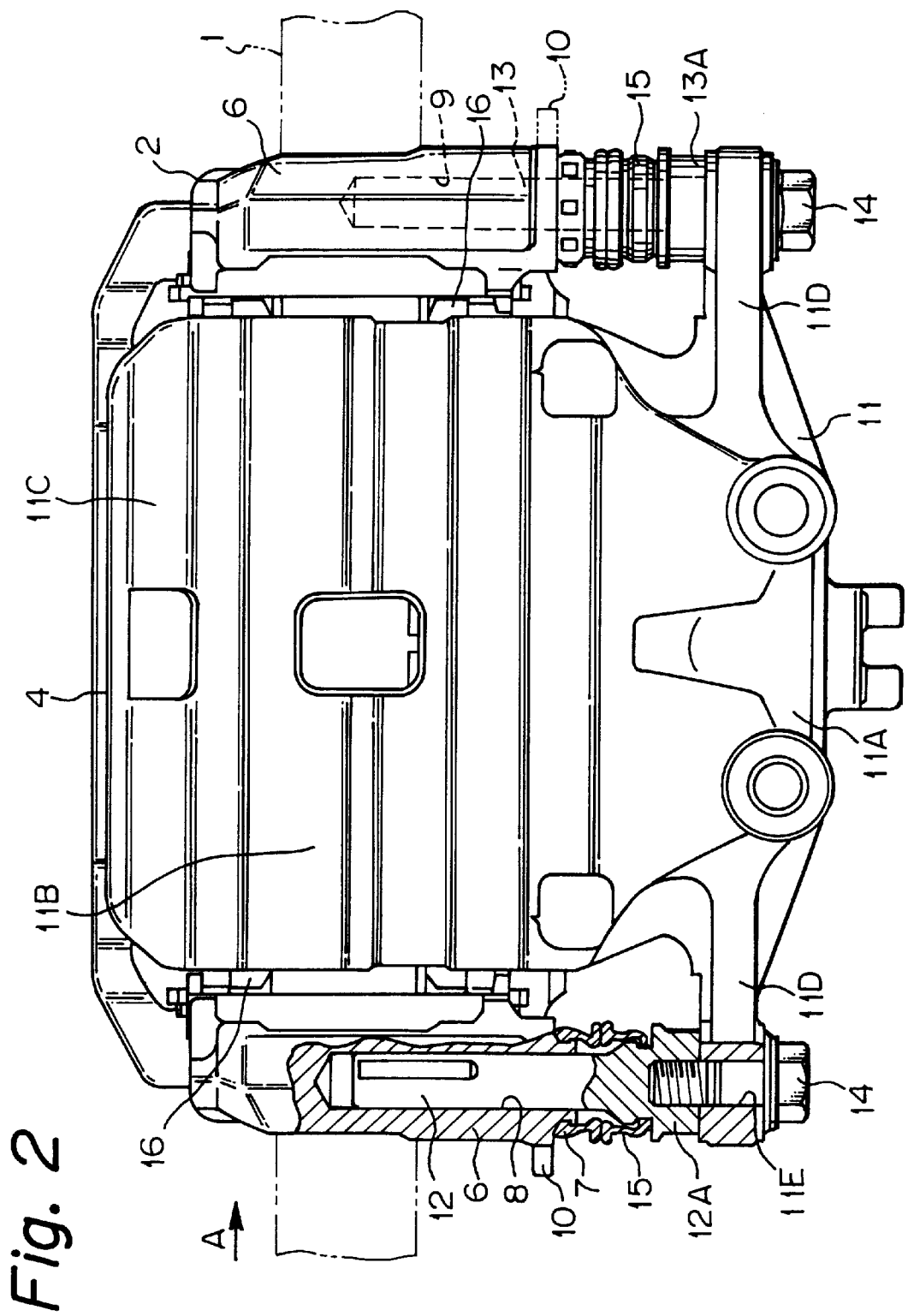
FIG. 2 is a plan view of the disk brake shown in FIG. 1.

A caliper 11 is slidably supported by the arms 6 of the mounting bracket 2. As shown in FIGS. 1 and 2, the caliper 11 comprises an inner leg portion 11A disposed at the inner side of the disk 1 and having a cylinder (not shown) formed so as to face the disk 1. A bridge portion (disk-pass portion) 11B is provided which extends from the inner leg portion 11A to the outer side of the disk 1 over the outer periphery of the disk 1 between the arms 6. An outer claw portion 11C is disposed at the outer side of the disk 1 to extend radially inward in relation to the disk 1 from the distal end of the bridge portion 11B. In addition, a pair of connecting portions 11D project leftward and rightward, respectively, from the inner leg portion 11A.

The connecting portions 11D have bolt receiving holes 11E (only one of them is shown in FIG. 2), respectively, which extend in an axial direction of the disk 1. Sliding pins 12 and 13 are mounted to the connecting portions 11D, respectively, through bolts 14 (described later) or the like.

The sliding pins 12 and 13 are slidably fitted in the pin holes 8 and 9, respectively, thereby enabling the caliper 11 to be slidably supported by the arms 6 of the mounting bracket 2.

The left and right sliding pins 12 and 13 are slidably fitted in the pin holes 8 and 9 of the arms 6, interposed between the mounting bracket 2 and the caliper 11. The sliding pins 12 and 13 have the same outer diameter. Accordingly, the clearance between the sliding pin 12 and the pin hole 8 is larger than that between the sliding pin 13 and the pin hole 9. The heads 12A and 13A of the sliding pins 12 and 13 are fixedly connected to the connecting portions 11D, respectively, of the caliper 11 through the bolts 14.

The left and right dust boots 15 are provided around the outer peripheries of the sliding pins 12 and 13, respectively, between the arms 6 and the connecting portions 11D of the caliper 11. The dust boots 15 are each formed in the shape of a bellows so as to cover the outer peripheries of the sliding pins 12 and 13. Each dust boot 15 is tightly fitted at one end thereof into the mounting groove 7 of the corresponding arm 6. The other ends of the dust boots 15 are tightly fitted onto the distal end portions of the sliding pins 12 and 13, respectively. The dust boots 15 prevent external rainwater or the like from entering the area between the sliding surfaces of the pin holes 8 and 9 and those of the sliding pins 12 and 13.

Friction pads 16 are disposed at the inner and outer sides, respectively, of the disk 1. Each friction pad 16 is slidably attached to the pad guide portions 6A of the arms 6 through a pair of pad springs 16A. In braking operation, the friction pads 16 are pressed against both sides of the disk 1 by the piston provided in the caliper 11, and torque from the disk 1 is borne by the pad guide portions 6A.

The disk brake mounting bracket according to this embodiment has the above-described arrangement. The operation of the disk brake mounting bracket will be described below.

When a braking operation is initiated, the piston provided in the inner leg portion 11A of the caliper 11 is caused to slide toward the disk 1 by the externally supplied hydraulic pressure. The friction pads 16 are then pressed against both sides of the disk 1 between the piston and the outer claw portion 1C. As a result, torque from the disk 1 is applied as a load to the arms 6 through the friction pads 16 and borne by the arms 6. Thus, braking force is applied to the disk 1.

Of the arms 6, the right-hand arm 6 is located forward (exit side) of the left-side arm 6 with respect to the rotation direction (direction of the arrow A) of the disk 1. Hence, the torque from the disk 1 acts on the right-hand arm 6 to a greater extent than on the left-hand arm 6. Therefore, the inner diameter of the pin hole 8 is set larger than that of the pin hole 9 to make the clearance for the sliding pin 12 larger than that for the sliding pin 13. Thus, even when the right-hand arm 6, together with the pin hole 9, is shifted in the rotation direction of the disk 1 due to elastic deformation by the torque from the disk 1, the pin hole 8 and the sliding pin 12 enable the caliper 11 to slide smoothly in the axial direction of the disk 1.

Next, a method of producing the mounting bracket 2 will be described with reference to FIGS. 7 to 10.

First, in a molding process, the mounting bracket 2' as a stock used to produce the mounting bracket 2 is molded by casting or other similar method (see FIG. 7). In this process, the mounting bracket 2' is molded such that the projections 10 are integrally formed on the arms 6, respectively, and that the overall configuration of the mounting bracket 2', including the projections 10, is symmetric about the center line B—B.

That is, in the molding process, the mounting bracket 2', which comprises the bracket body 3, the reinforcing beam 4, the fixing portions 5, and the arms 6, is molded. At the same time, the projections 10 are integrally formed on the arms 6, respectively, such that the mounting bracket 2' is symmetric in the lateral direction.

Figure 8:
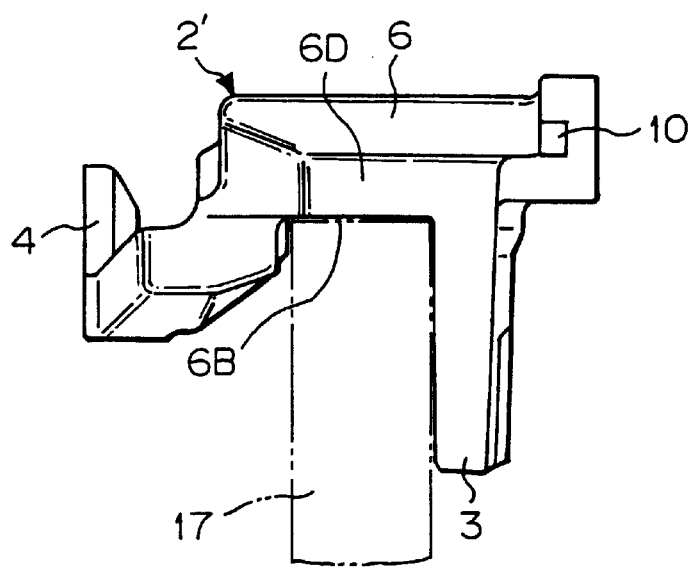
FIG. 8 is a side view of the mounting member as viewed from the left-hand side in FIG. 7.

Next, in a disk pass cutting process shown in FIGS. 7 and 8, a disk-shaped milling cutter 17 or the like is driven to rotate, the milling cutter thereby forms a disk pass portion 6B by cutting at a longitudinal intermediate position of each arm 6 of the mounting bracket 2'.

Figure 9:
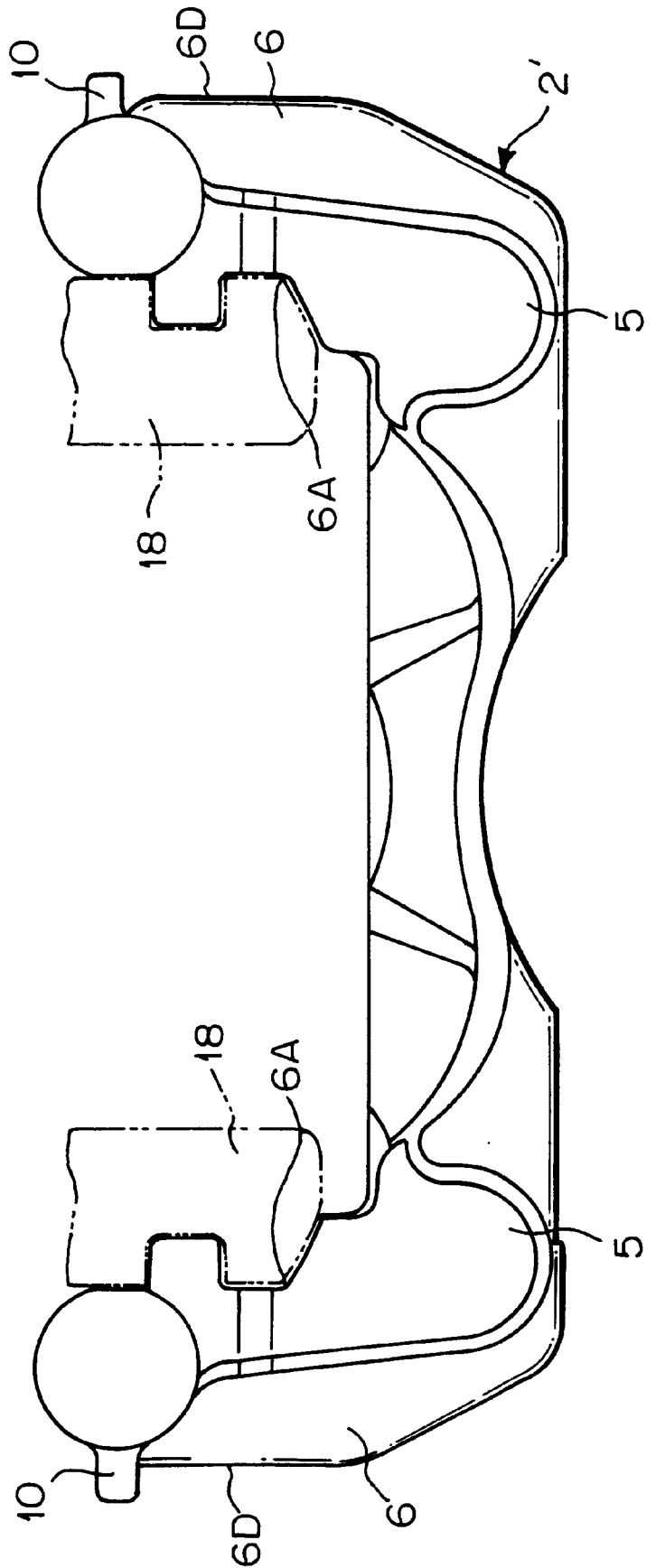
FIG. 9 is a front view of the mounting member, showing a pad guide cutting process.

Next, in a pad guide cutting process shown in FIG. 9, pad guide portions 6A are cut at the proximal and distal ends of each arm 6 by a broach cutter 18 or the like.

Figure 10:
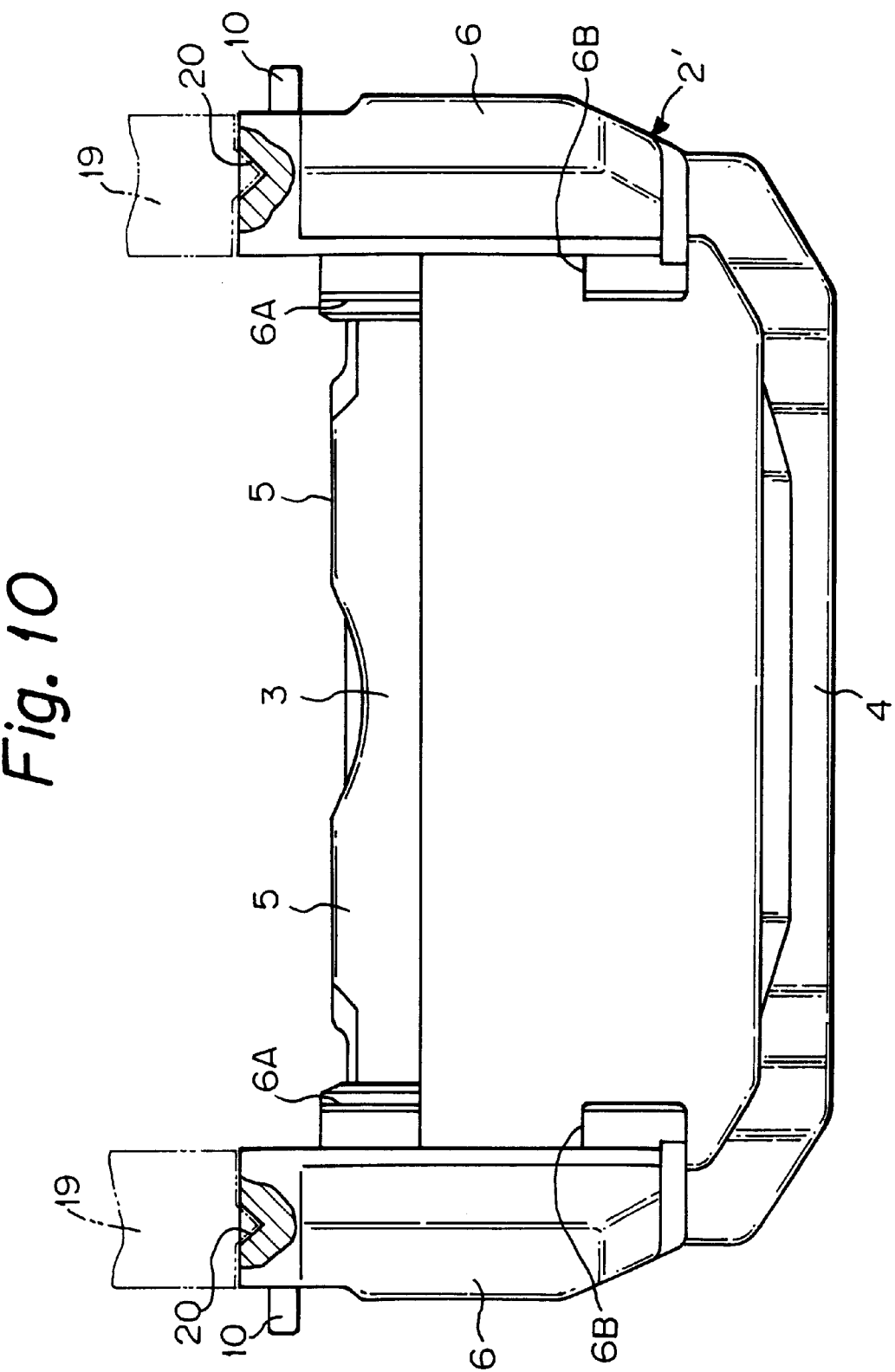
FIG. 10 is a bottom view of the mounting member, showing a first pin hole drilling process.

Next, in a first pin hole drilling process shown in FIG. 10, a center hole 20 having an approximately conical sectional configuration is formed in the center of the proximal end surface of each arm 3 by a center drill 19.

Figure 11:
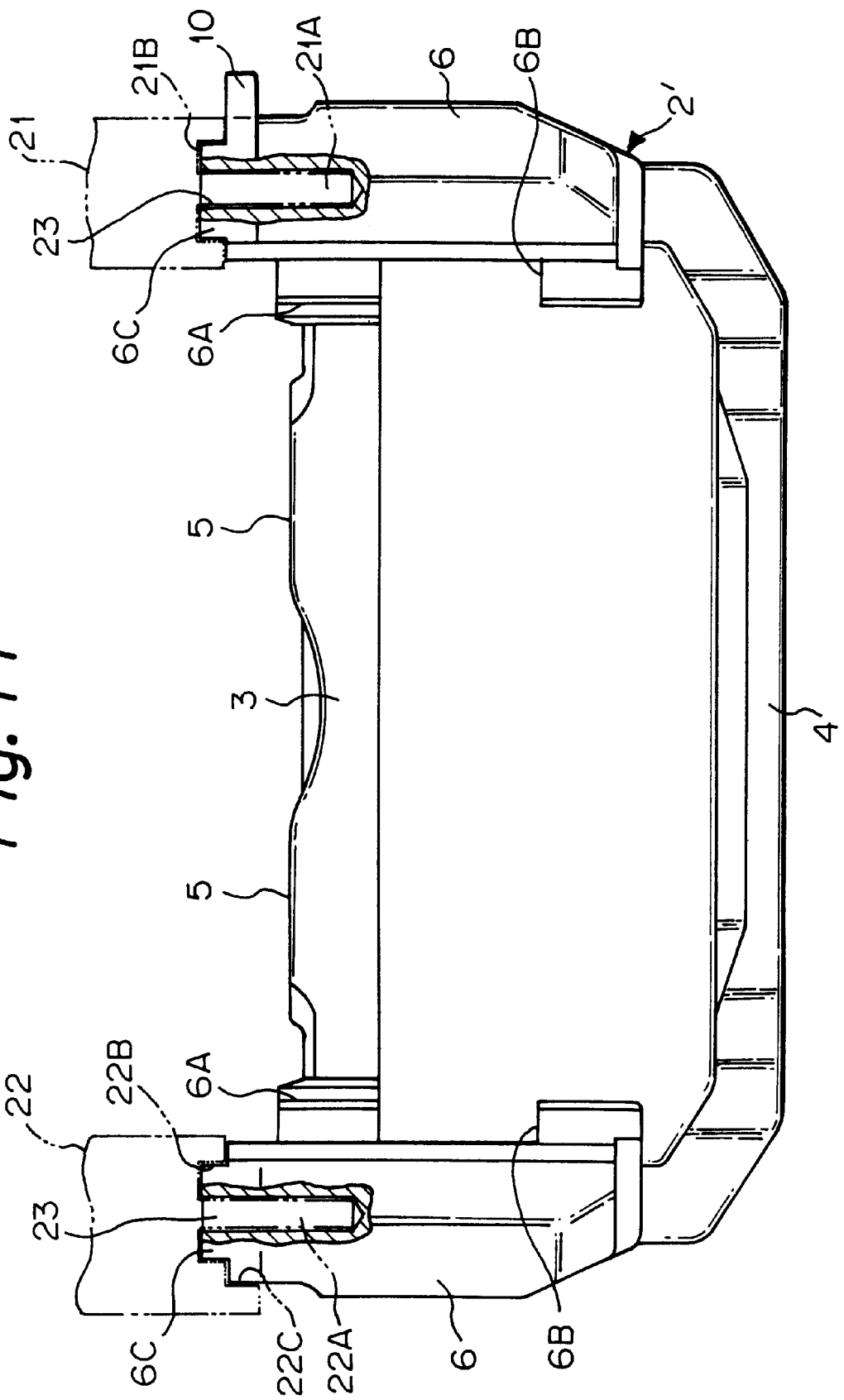
FIG. 11 is a bottom view of the mounting member, showing a second pin hole drilling process.

Next, in a second pin hole drilling process shown in FIG. 11, cutting tools 21 and 22 are driven to rotate about the center holes 20, respectively, to form left and right circular holes 23. These holes extend in an axial direction of the arms 6, and are holes prepared by short-shaft drills 21A and 22A provided on the respective centers of the cutting tools 21 and 22. At the same time, mounting cylindrical portions 6C are formed on the respective proximal end surfaces of the arms 6 by first cutting edges 21B and 22B provided around the respective outer peripheries of the drills 21A and 22A.

Of the cutting tools 21 and 22, the cutting tool 22 further has a second cutting edge 22C for cutting off the projection 10. The second cutting edge 22C is disposed at the outer periphery of the cutting edge 22B. Of the two projections 10 previously provided on the arms 6, only the projection 10 provided on the right-hand arm 6 is cut off by the cutting edge 22C at the same time as the circular holes 23 and the mounting cylindrical portions 6C are formed by the cutting tools 21 and 22. The second pin hole drilling process is a process to altar the projections 10 by forming the projections into shapes that are different from each other by substantially cutting off one of the projections 10.

On a mounting bracket 2 for a right wheel, the projection 10 on the left-hand arm 6 remains, while and the projection 10 on the right-hand arm 6 is cut off, as shown in FIG. 2. Regarding a mounting bracket 2 for a left wheel, the projection 10 on the left-hand arm 6 is cut off, while the projection 10 on the right-hand arm 6 remains.

At the proximal end of each arm 6, the mounting cylindrical portion 6C projects by a predetermined length in the axial direction of the arm 6. Therefore, when the arms 6 are cut by the cutting tools 21 and 22, sections of the proximal end portions of the arms 6 (other than the mounting cylindrical portions 6C) can be prevented from being undesirably cut by the cutting edges 21B, 22B and 22C.

Figure 12:
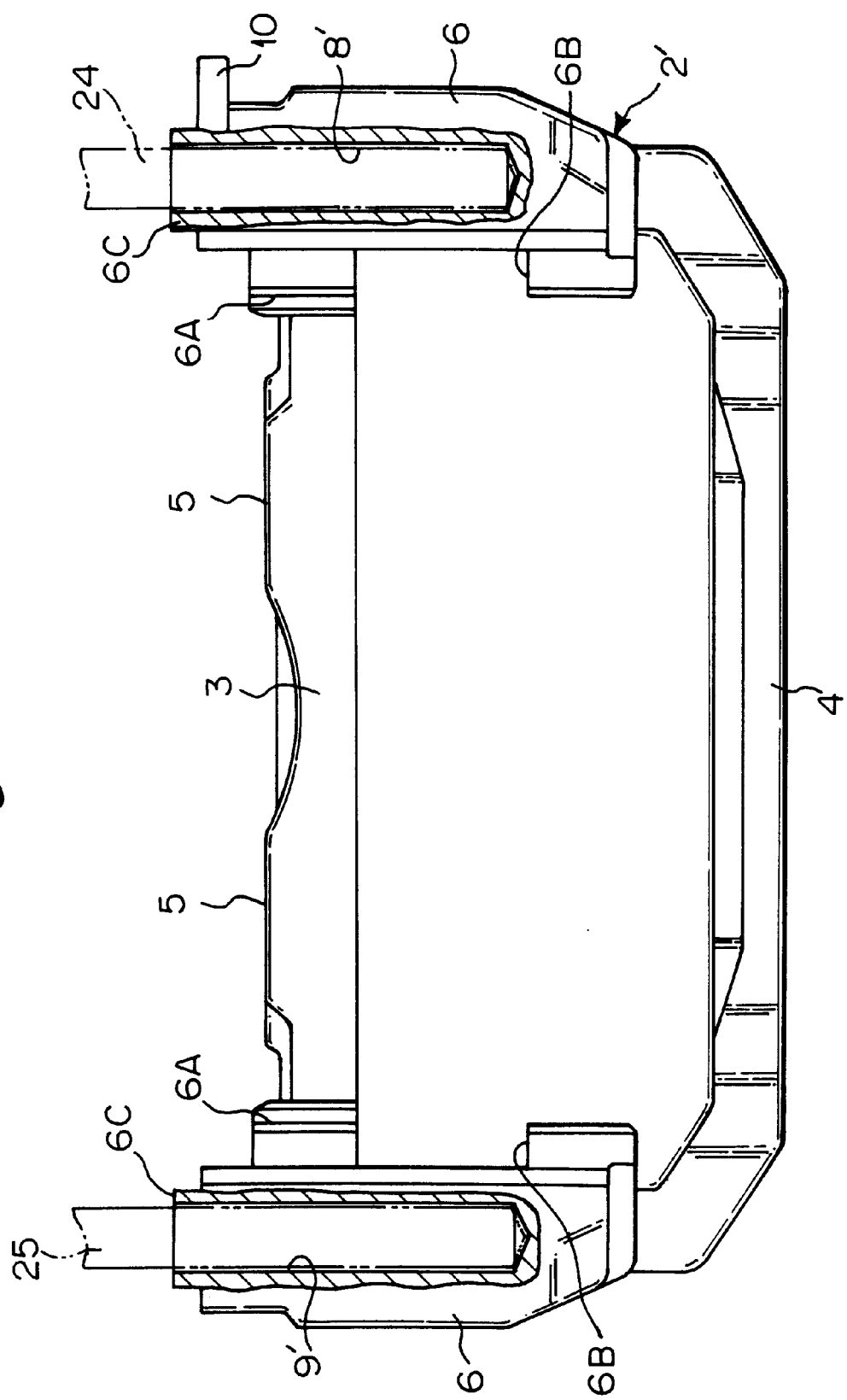
FIG. 12 is a bottom view of the mounting member, showing a third pin hole drilling process.

Next, in a third pin hole drilling process shown in FIG. 12, the arm 6 having the projection 10 integrally formed thereon and the arm 6 having the projection 10 cut off are automatically distinguished from each other in advance by detecting the presence of a projection 10 with an electric sensor (not shown) or the like. Consequently, deep hole drilling tools 24 and 25 having drill diameters approximately corresponding to the bore diameters of the pin holes 8 and 9 are automatically selected (prepared) for the arms 6, respectively. By rotating the deep hole drilling tools 24 and 25, the circular holes 23 are cut to form pin holes 8' and 9' in the arms 6.

Figure 13:
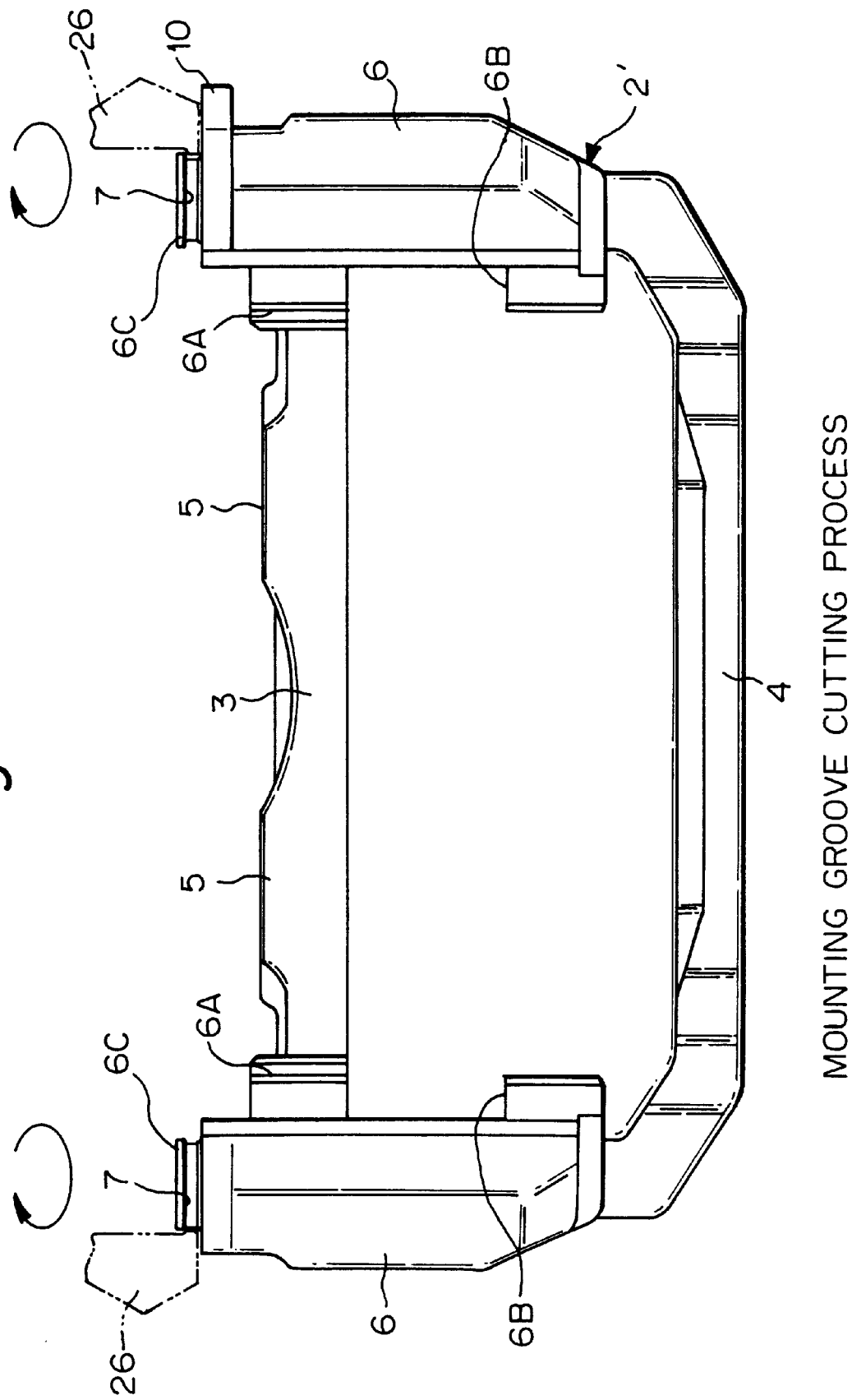
FIG. 13 is a bottom view of the mounting member, showing a mounting groove cutting process.

Next, in a mounting groove cutting process shown in FIG. 13, cutting tools 26 are driven to form mounting grooves 7 on the respective outer peripheral surfaces of the mounting cylindrical portions 6C.

Figure 14:
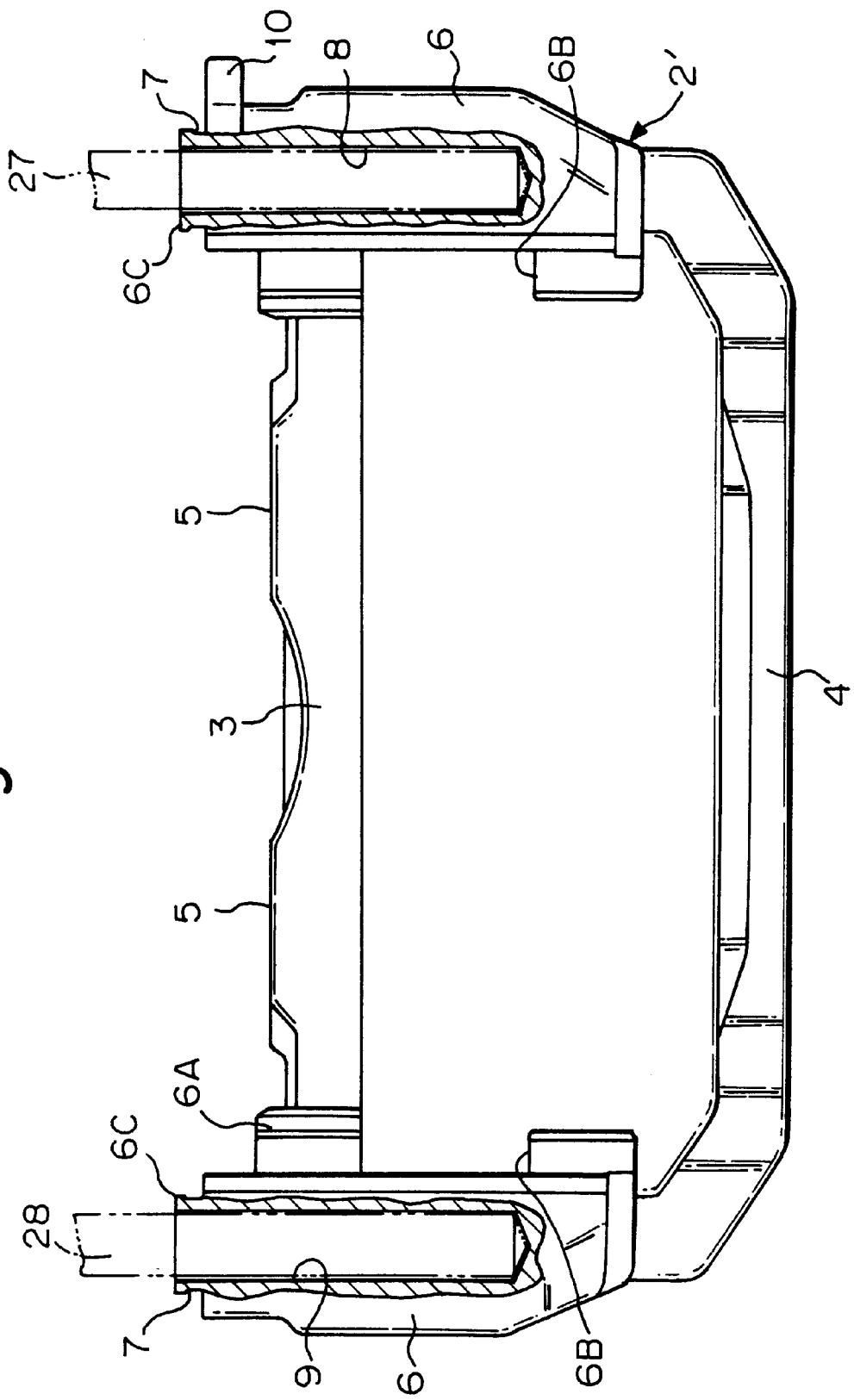
FIG. 14 is a bottom view of the mounting member, showing a fourth pin hole drilling process.

In a fourth pin hole drilling process shown in FIG. 14, the arms 6 are automatically distinguished from each other in advance by detecting the presence of a projection 10 with the electric sensor or the like as in the case of the third pin hole drilling process. As a result, reamers 27 and 28 having drill diameters corresponding to the respective bore diameters of the pin holes 8 and 9 are automatically selected (prepared) for the arms 6. Then, the reamers 27 and 28 are driven to finish (ream) the pin holes 8' and 9', thereby forming pin holes 8 and 9 in the arms 6, respectively.

Finally, in a screw hole drilling process, screw holes 5A are formed in the respective fixing portions 5 of the bracket body 3 with drills (not shown) or the like, thereby forming a mounting bracket 2.

Thus, in the above-described embodiment, a projection 10 is integrally formed on each arm 6 of the mounting bracket 2' in the molding process. In the subsequent pin hole drilling process, as shown in FIG. 11, circular holes 23, which are holes prepared for pin holes 8 and 9, are formed in the arms 6 by using the cutting tools 21 and 22, respectively. At the same time, either one of the projections 10 is cut off. Therefore, when the pin holes 8 and 9 with different bore diameters are drilled in the arms 6 thereafter, it is possible to surely prevent the mistake of drilling pin holes 8 and 9 in the wrong arms 6 by confirming the presence of a projection 10. Moreover, mounting brackets 2 to be used respectively for right and left wheels can be readily distinguished from each other by the presence of the projection 10.

Therefore, this embodiment enables a marked reduction in the cost of producing molds used to form mounting brackets 2' for right and left wheels, and makes it unnecessary to divide such molds into two types. Consequently, mold management costs can be favorably reduced.

In the second pin hole drilling process, one of the projections 10 can be cut at the same time as the mounting cylindrical portions 6C and the circular holes 23 are formed by the cutting tools 21 and 22 because the projections 10 are formed at respective positions near the portions to be formed as the open ends of the pin holes 8 and 9. Therefore, the working efficiency in machining the projection 10 can be surely improved.

In the third and fourth pin hole drilling processes, the arms 6 can be automatically distinguished from each other through the projection 10 with an electric sensor or the like. Therefore, it is possible to surely prevent the operator from erroneously drilling the pin holes 8 and 9 with wrong deep hole drilling tools 24 and 25 or reamers 27 and 28. Thus, the pin holes 8 and 9 can be correctly formed in each of the arms 6, respectively.

With the conventional technique, it is likely that a mounting bracket 2 for a right wheel will be mistaken for a mounting bracket 2 for a left wheel, or vice versa. This may cause erroneous installation when the caliper 11 is installed on the mounting bracket 2 or when the mounting bracket 2 is mounted on a non-rotating portion of a vehicle. According to this embodiment, mounting brackets 2 to be used for right and left wheels, respectively, can be readily distinguished from each other with an electric sensor or the like. Thus, it is possible to surely prevent the occurrence of such erroneous installation and hence possible to improve the working efficiency in such a mounting operation.

A projection 10 is formed on each arm 6 so as to project to a position outside the disk 1, and formed at a position near the mounting groove 7. Therefore the cutting tool 26 is provided with a cutting edge similar to the second cutting edge 22C, the projection 10 can be cut off in the mounting groove cutting process at the same time as the mounting groove 7 is cut instead of cutting off the projection 10 in the second pin hole drilling process. By doing so, it is possible to improve the working efficiency in cutting the projection 10 and also possible to select an appropriate process for cutting the projection 10.

As shown in FIG. 3, the left and right arms 6 have flat side portions 6D formed on the respective outer sides remote from the pad guide portions 6A. The projections 10 are formed at respective positions outside the corresponding side portions 6D as viewed in the radial direction of the disk 1. Therefore, in the disk pass cutting process and the pad guide cutting process, a clamp jig (not shown) for clamping the mounting bracket 2' can be placed on the flat side portions 6D, which lie inside the corresponding projections 10 as viewed in the radial direction of the disk 1. Accordingly, the mounting bracket 2' can be reliably clamped. Moreover, the clamp jig can be surely prevented from colliding with either of the projections 10 even when the clamp jig is slid in the axial direction of each arm 6 to remove it from the mounting bracket 2'. Thus, the clamp jig can be smoothly attached to and removed from the mounting bracket 2'.

In the foregoing embodiment, of the projections 10 formed on the respective arms 6 of the mounting bracket 2', the right-hand projection 10 is cut off. However, it should be noted that the present invention is not necessarily limited thereto. For example, the left-hand projection 10 may be cut off. It is also possible to alter the projections 10 by forming them into different shapes by cutting off a part of at least one of the projections 10.

Although in the foregoing embodiment the projection 10 is detected with an electric sensor, the projection 10 may be mechanically recognized instead of using an electric sensor to distinguish the arms 6 from each other.

Although in the foregoing embodiment the disk brake is applied to an automobile, it should be noted that the present invention is not necessarily limited to the described application, but may also be applied to other vehicles, e.g. two-wheeled vehicles.

As has been detailed above, according to the present invention, the left and right arms of a mounting member are previously provided with left and right projections, respectively, so that the overall configuration of the mounting member is symmetric. Therefore, before a pin hole for a sliding pin is drilled in each arm, the overall configuration of the mounting member, including the projections, can be made symmetric. Accordingly, mounting members to be used, for example, for left and right wheels, respectively, can be formed using the same mold.

Therefore, molds can be made common to mounting members for right and left wheels. Consequently, it is possible to markedly reduce the cost of producing molds used to produce the mounting members and to cut the management costs needed for a mold sorting operation.

Further, since at least one of the projections is formed with a different shape, pin holes can be drilled in the corresponding arms without a mistake by recognizing the difference in shape between the projections through an operator's visual check or with a sensor or the like. Furthermore, it is possible to surely prevent the operator from erroneously installing a caliper for a right wheel on a mounting member for a left wheel, for example.

Moreover, since the projections are provided near the respective open ends of the pin holes, at least one of the projections can be readily cut at the same time as the pin holes are formed by using cutting tools or other similar devices.

The mounting grooves may be cut with cutting tools or the like in such a manner that at least one of the projections provided near the mounting grooves is cut at the same time as the mounting grooves are cut. In this case, the working efficiency in machining the projection can also be markedly improved as above.

What is claimed is:

1. An apparatus comprising:

an integrally-molded member for a disk brake including a bracket body having an inner side, an outer side, and opposite lateral ends, said member further including a left arm having an exterior side and a left pin hole, a right arm having an exterior side and a right pin hole, said left arm and said right arm being spaced apart on said opposite lateral ends of said bracket body, a left projection extending from said exterior side of said left arm for indicating a left side of said bracket body, and a right projection extending from said exterior side of said right arm for indicating a right side of said bracket body, said left projection being symmetrical with said right projection with respect to a medial axis of said bracket body;

wherein said left and right arms extend inward of said inner side of said bracket body, said projections extending from said exterior sides of each of said arms at a position inward of said inner side of said bracket body such that a cutting tool rotating about a center axis of one of said pin holes is capable of cutting respective said projection without interference from said bracket body.

2. The apparatus of claim 1, wherein said left pin hole and said right pin hole have different bore diameters.

3. The apparatus of claim 2, wherein each of said left arm and right arm include a mounting groove for a dust boot.

4. The apparatus of claim 1, wherein each of said left arm and right arm include a mounting groove for a dust boot.

5. An apparatus comprising:

an integrally-molded member for a disk brake including a bracket body having an inner side, an outer side, and opposite lateral ends, said member further including a left arm having an exterior side and a left pin hole, a right arm having an exterior side and a right pin hole, said left arm and said right arm being spaced apart on said opposite lateral ends of said bracket body, a left projection extending from said exterior side of said left arm for indicating a left side of said bracket body, and a right projection extending from said exterior side of said right arm for indicating a right side of said bracket body;

wherein said left and right arms extend inward of said inner side of said bracket body, said projections extending from said exterior sides of each of said arms at a position inward of said inner side of said bracket body such that a cutting tool rotating about a center axis of one of said pin holes is capable of cutting respective said projection without interference from said bracket body; and wherein one of said left and right projections includes an alteration.

6. The apparatus of claim 5, wherein said left pin hole and said right pin hole have different bore diameters.

7. The apparatus of claim 6, wherein each of said left arm and right arm include a mounting groove for a dust boot.

8. The apparatus of claim 5, wherein each of said left arm and right arm include a mounting groove for a dust boot.

* * * * *